US009456550B2

(12) United States Patent
Suen et al.

(10) Patent No.: US 9,456,550 B2
(45) Date of Patent: Oct. 4, 2016

(54) THRESHING AND SEPARATING DEVICE AND COMBINE HARVESTER HAVING THE SAME

(71) Applicant: John Deere (Tianjin) Co., Ltd., Tianjin (CN)

(72) Inventors: Benjamin C. Suen, Bettendorf, IA (US); Yibin Zhuang, Tianjin (CN); Junbang Li, Tianjin (CN); Fengbin Pang, Tianjin (CN); Yanpeng Han, Tianjin (CN); Hongyuan Wang, Tianjin (CN); Xiubing Pang, Tianjin (CN); Baohuan Zhen, Tianjin (CN)

(73) Assignee: John Deere (Tianjin) Co. Ltd, Tianjin (CN)

( * ) Notice: Subject to any disclaimer, the term of this patent is extended or adjusted under 35 U.S.C. 154(b) by 0 days.

(21) Appl. No.: 14/627,453

(22) Filed: Feb. 20, 2015

(65) Prior Publication Data

US 2015/0237805 A1    Aug. 27, 2015

(30) Foreign Application Priority Data

Feb. 24, 2014 (CN) .......................... 2014 1 0061807
Feb. 24, 2014 (CN) .......................... 2014 1 0061976

(51) Int. Cl.
*A01F 7/06* (2006.01)
*A01F 12/44* (2006.01)
(Continued)

(52) U.S. Cl.
CPC .............. *A01F 12/46* (2013.01); *A01D 41/02* (2013.01); *A01D 41/12* (2013.01); *A01F 7/04* (2013.01); *A01F 7/06* (2013.01); *A01F 12/22* (2013.01); *A01F 12/24* (2013.01); *A01F 12/39* (2013.01)

(58) Field of Classification Search
CPC ........ A01F 7/06; A01F 12/442; A01F 12/10; A01F 12/00; A01F 12/22; A01F 12/24

USPC ......................................... 460/80, 16, 69, 66
See application file for complete search history.

(56) References Cited

U.S. PATENT DOCUMENTS 1,772,978 A * 8/1930 Barhorst ................. A01F 12/00
460/89

(Continued)

FOREIGN PATENT DOCUMENTS

EP      0522268 A2    1/1993
EP      0591688 A2    4/1994
WO   2009001216 A2   12/2008

OTHER PUBLICATIONS

European Search Report issued in counterpart application No. 15155590.1, dated Jul. 9, 2015 (7 pages).

*Primary Examiner* — Árpád Fábián-Kovács

(57) ABSTRACT

A threshing and separating device comprises a first threshing and separating mechanism, a second threshing and separating mechanism, and an intermediate feeding mechanism therebetween. The first threshing and separating mechanism comprises a first cylinder in a form of a toothed rod and a first concave in a form of a wire-grate, and a surface of the first concave facing the first cylinder is provided with no part protruding into a tip circle of threshing teeth of the first cylinder; the second threshing and separating mechanism comprises a second cylinder in a form of a toothed rod and a second concave in a form of a wire-grate, and a surface of the second concave facing the second cylinder is provided with no part protruding into a tip circle of threshing teeth of the second cylinder; the second cylinder comprises a forced feeding portion located at front end thereof and comprising a truncated cone and helical blades on the truncated cone; and a toothed-rod cylinder portion located behind the forced feeding portion and comprising a plurality of second rods parallel to the rotation axis of the second cylinder and uniformly arranged in a circumferential direction thereof, and each second rod is provided with a plurality of second threshing teeth.

12 Claims, 11 Drawing Sheets

(51) Int. Cl.
*A01F 12/46* (2006.01)
*A01F 7/04* (2006.01)
*A01D 41/02* (2006.01)
*A01D 41/12* (2006.01)
*A01F 12/22* (2006.01)
*A01F 12/24* (2006.01)
*A01F 12/39* (2006.01)

(56) References Cited

U.S. PATENT DOCUMENTS

| | | | | |
|---|---|---|---|---|
| 2,079,547 A * | 5/1937 | Court | A01D 46/10 | 19/37 |
| 2,123,405 A * | 7/1938 | Court | A01D 46/08 | 19/37 |
| 2,754,827 A * | 7/1956 | McCreery | B02B 3/08 | 460/23 |
| 4,362,168 A * | 12/1982 | Hengen | A01F 12/18 | 460/121 |
| 4,408,618 A * | 10/1983 | Witzel | A01F 7/06 | 460/80 |
| 4,492,237 A * | 1/1985 | Pakosh | A01F 12/00 | 414/526 |
| 4,611,605 A * | 9/1986 | Hall | A01F 7/06 | 460/80 |
| 4,611,606 A * | 9/1986 | Hall | A01F 12/442 | 460/80 |
| 4,739,773 A * | 4/1988 | West | A01F 12/442 | 460/113 |
| 4,875,891 A * | 10/1989 | Turner | A01F 12/442 | 460/108 |
| 5,112,279 A * | 5/1992 | Jensen | A01F 12/442 | 460/69 |
| 5,152,717 A * | 10/1992 | Nelson | A01F 12/442 | 460/110 |
| 5,334,093 A * | 8/1994 | Jensen | A01F 12/442 | 460/107 |
| 5,342,239 A * | 8/1994 | West | A01F 12/22 | 460/110 |
| 5,356,338 A * | 10/1994 | Braunhardt | A01F 7/06 | 460/119 |
| 5,556,337 A * | 9/1996 | Tophinke | A01F 12/442 | 460/70 |
| 5,688,170 A * | 11/1997 | Pfeiffer | A01F 7/06 | 460/69 |
| 5,733,192 A * | 3/1998 | Jones | A01F 12/22 | 460/106 |
| 6,257,977 B1 * | 7/2001 | Moriarty | A01F 7/06 | 460/68 |
| 6,352,474 B1 * | 3/2002 | Payne | A01F 7/06 | 460/111 |
| 6,375,564 B1 * | 4/2002 | Amann | A01F 12/442 | 460/121 |
| 7,462,101 B2 * | 12/2008 | Grywacheski | A01F 12/20 | 460/119 |
| 7,682,236 B2 * | 3/2010 | Buermann | A01F 7/067 | 460/109 |
| 8,109,815 B2 * | 2/2012 | Hollatz | A01F 7/067 | 460/16 |
| 8,231,446 B2 * | 7/2012 | Pope | A01F 7/067 | 460/62 |
| 2002/0045469 A1 * | 4/2002 | Schwersmann | A01F 12/10 | 460/70 |
| 2012/0100898 A1 * | 4/2012 | Mygind | A01F 7/067 | 460/22 |

* cited by examiner

THRESHING AND SEPARATING DEVICE AND COMBINE HARVESTER HAVING THE SAME

CROSS-REFERENCE TO RELATED APPLICATIONS

This application claims the benefit of Chinese Patent Application No. 201410061807.6 filed on Feb. 24, 2014 in the State Intellectual Property Office of China, the whole disclosure of which is incorporated herein by reference.

This application also claims the benefit of Chinese Patent Application No. 201410061976.X filed on Feb. 24, 2014 in the State Intellectual Property Office of China, the whole disclosure of which is incorporated herein by reference.

FIELD OF THE INVENTION

The present invention generally relates to a threshing and separating device and a combine harvester comprising the same.

BACKGROUND OF THE INVENTION

In a combine harvester, a harvesting device is used to harvest crops, and a threshing and separating device is used to separate grains from the harvested crops. DE 32 14 161 C2 disclosed a threshing and separating device with combined tangential and axial flows. Currently, this kind of threshing and separating device has become a standard configuration for a large-size harvester which has a feeding rate greater than 7 kg/s. For crops whose grains are not easy to be separated and whose stalks have a good toughness, for example, rice, however, damaged grains and blockage are common problems often experienced in a combine harvester comprising such a threshing and separating device. The above problems will result in increased power consumption of the combine harvester. And the above problems become particularly significant in combine harvesters having a greater feeding rate.

An object of the present invention is to solve or at least reduce one or more of the above problems.

SUMMARY OF THE INVENTION

A design is applied for threshing and separating: a first cylinder and a first concave, which are mainly used for threshing, are designed to comprise a threshing teeth embedded into one another so as to increase a combing or threshing effect on crops; an intermediate feeding device is used to convey the crops backwards; and at least one second cylinder (or two second cylinders), which is (or are) mainly used for separating, is configured to comprise an enclosed cylinder body and teeth arranged along a length of the cylinder body so that grains and stalks of the crops are separated more completely.

The threshing and separating device of the present invention comprises: a threshing mechanism comprising a first cylinder and a first concave located below the first cylinder; a separating mechanism comprising at least one second cylinder and a second concave located below the second cylinder; and an intermediate feeding mechanism between the threshing mechanism and the separating mechanism; the first cylinder is rotatable about a first rotation axis and comprises a plurality of first rods parallel to the first rotation axis and uniformly arranged in a circumferential direction of the first cylinder, and each first rod is provided with a plurality of first threshing teeth each having a tip, the tips of the first threshing teeth define a first tip circle; the second cylinder is rotatable about a second rotation axis perpendicular to the first rotation axis, wherein, the first concave comprises a wire-grate configuration, and a surface of the first concave facing the first cylinder is provided with no part protruding into the first tip circle; the second cylinder comprises: a forced feeding portion located at front end of the second cylinder, and comprising a truncated cone and helical blades on the truncated cone; and a toothed-rod cylinder portion located behind the forced feeding portion and comprising a plurality of second rods parallel to the second rotation axis and uniformly arranged in a circumferential direction of the toothed-rod cylinder portion, and each second rod is provided with a plurality of second threshing teeth each having a tip, the tips of the second threshing teeth define a second tip circle; the second concave has a wire-grate configuration and is provided with no part protruding into its corresponding second tip circle.

The first cylinder and first concave are designed so that no structures thereof are embedded into one another, thus, damage of grains due to a strong combing or threshing effect can be avoided or reduced. Such a design actually leads to reduction in threshing effect of the first cylinder and the first concave; in order to compensate for the reduction in threshing effect and to overcome the problem that the second cylinder is susceptible to be wound and blocked, a following inventive improvement is made to the second cylinder in the present invention: a front section of the second cylinder is provided with the forced feeding portion comprising the helical blades, and a rear section of second cylinder is provided with an open-type cylinder body comprising the toothed rods; correspondingly, the second cylinder and the second concave are also designed so that no structures thereof are embedded into one another. With the above combination of the respective cylinders and corresponding concaves, the crops are gently threshed and separated in the whole harvesting process, while giving consideration to fluency in feeding the crops and reducing power consumption. Experimental results show that for example when harvesting rice by a large-size harvester at a nominal feeding rate of 7 kg/s, total loss caused by the harvester with the improved threshing and separating device is much lower than that caused by harvester with prior threshing and separating device; even the feeding rate reaches 13 kg/s, the total loss caused by harvester with the improved threshing and separating device is about 2.5%, which is still lower than a standard total loss of 3%.

Designs of the second cylinder, particularly of the forced feeding portion, may be made in accordance with additional features of dependent claims. These designs and features are provided to ensure the threshing and separating effects of the second cylinder while achieving optimal feeding fluency.

BRIEF DESCRIPTION OF THE DRAWINGS

Two embodiments of the invention are shown in the drawings, in which.

DETAILED DESCRIPTION OF THE PREFERRED EMBODIMENTS

Figure 1:
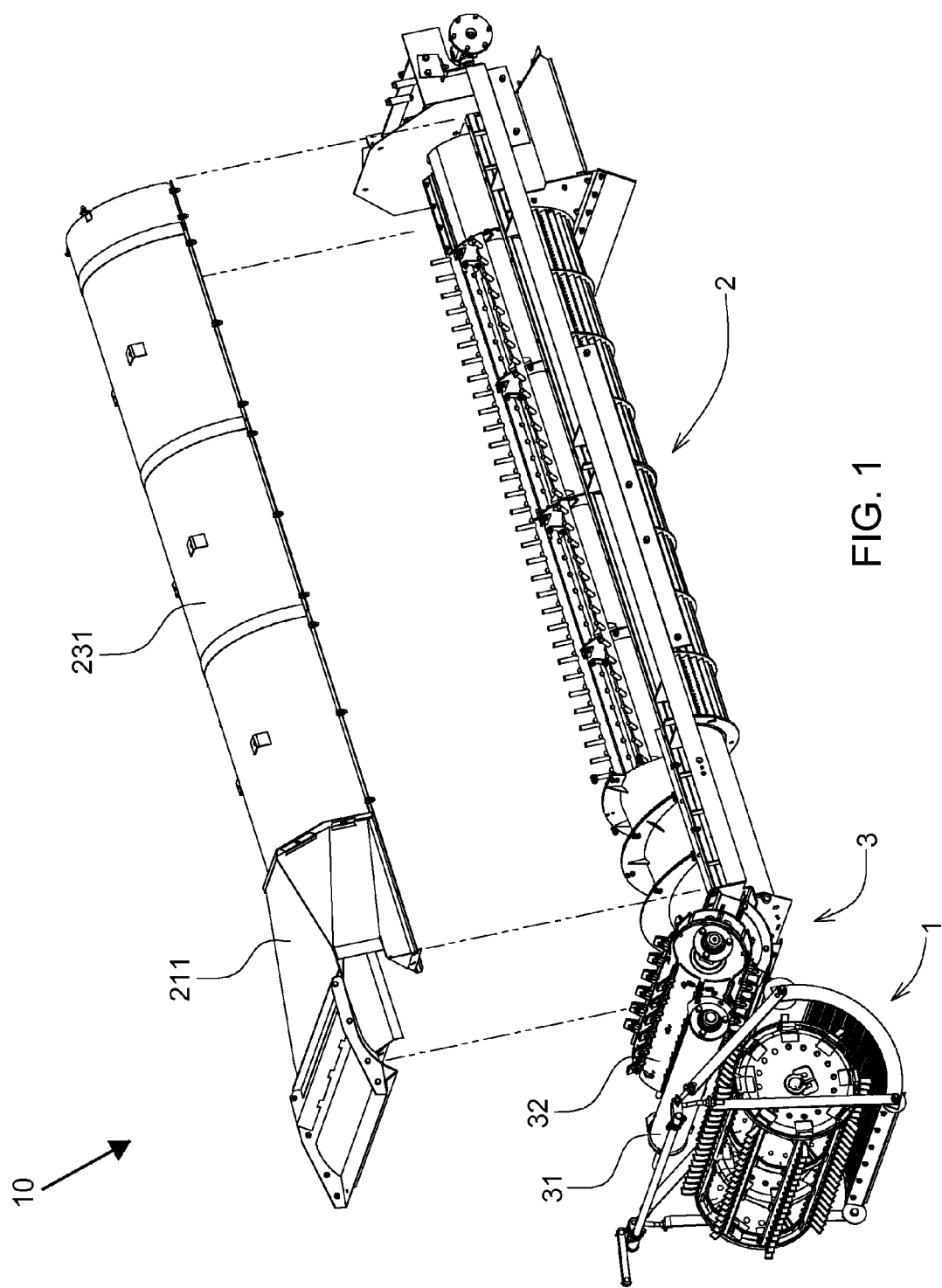
FIG. 1 shows a whole configuration of a threshing and separating device according to a first embodiment of the present invention.

FIG. 1 shows a threshing and separating device according to a first embodiment of the present invention for processing crops which flow through the device in a direction from left to right. For understanding the present invention, the left side of FIG. 1 from which the crops are fed is called as a front side, while the right side of FIG. 1 from which crop stalks are discharged is called as a rear side, and thereby a fore and aft direction is defined. Generally speaking, the front side is a side in a travelling direction of the combine harvester comprising the threshing and separating device.

The threshing and separating device 10 is provided with a first threshing and separating mechanism 1 consisted of a first cylinder 11 and a first concave 12 at its front part, a second threshing and separating mechanism 2 mainly consisted of a second cylinder 20 and a second concave 232 at its rear part, and an intermediate feeding mechanism 3 between the first and second threshing and separating mechanisms. Crops, after being fed into the threshing and separating device 10, are threshed by the first cylinder, and threshed grains fall through grids of the first concave into a grain collect system not shown; then, the crops are fed to the second threshing and separating mechanism 2 by the intermediate feeding mechanism 3, the crops are threshed and grains and stalks are separated from each other along a path in the second threshing and separating mechanism longer than that in the first threshing and separating mechanism, and the separated stalks are discharged from the rear side, while the separated grains fall into the grain collect system not shown.

Figure 2:
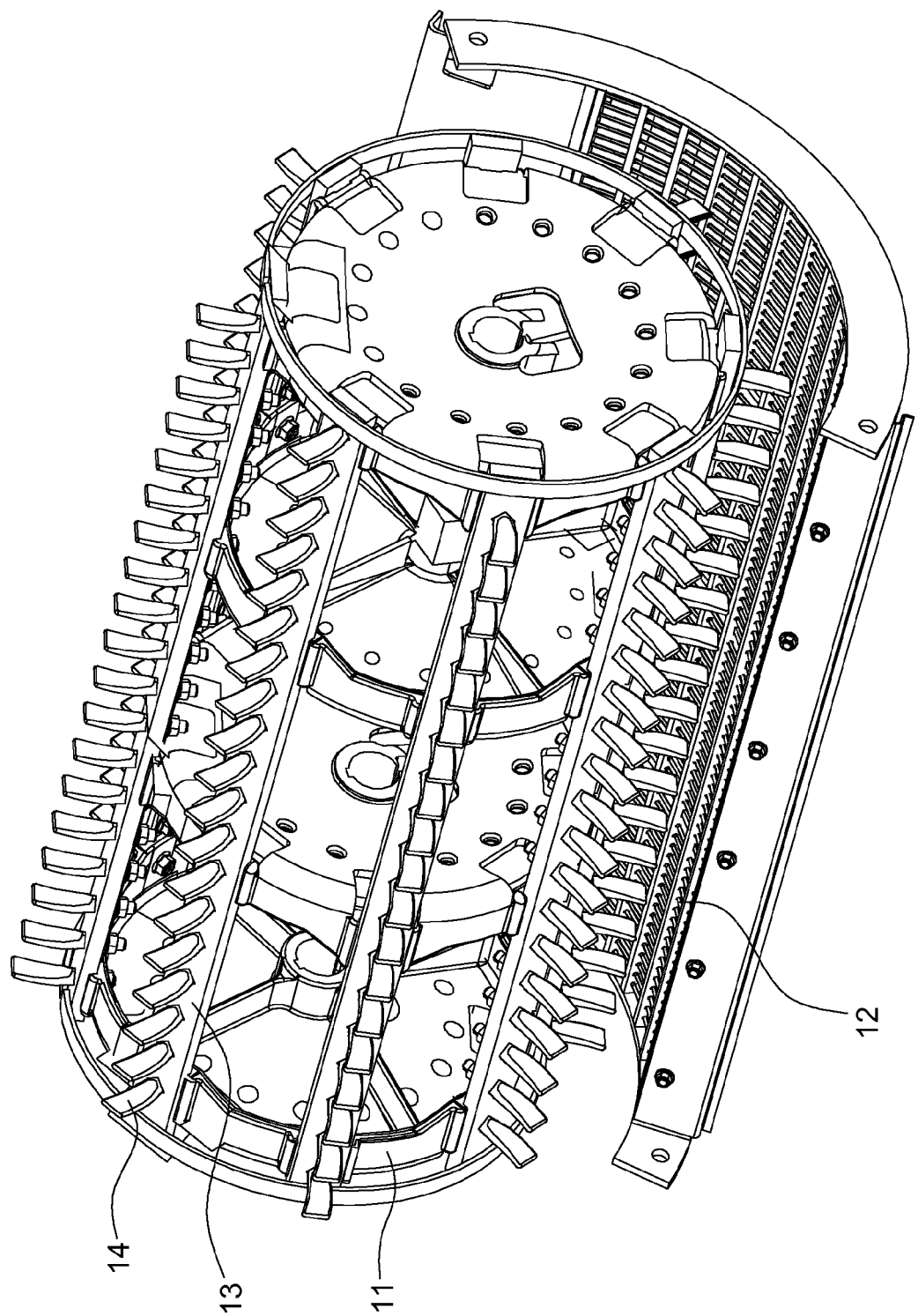
FIG. 2 shows a configuration of combined first cylinder and first concave.

With reference to FIG. 1 and FIG. 2, the first cylinder 11 has a first rotation axis in a horizontal direction, and the first rotation axis is perpendicular to the fore and aft direction and is often in a right and left direction of a combine harvester comprising the threshing and separating device. The first cylinder 11 comprises a plurality of first rods 13, which are parallel to the first rotation axis and uniformly arranged in a circumferential direction of the first cylinder; and each first rod 13 is provided with a plurality of first threshing teeth 14 each having a tip, all teeth have same length and their tips define a first cylindrical space, so each tip defines a first tip circle. Here the first cylindrical space and first tip circle have same meaning. The first concave 12 is a partial cylinder having a wire-grate configuration, located below and partially surrounds the first cylinder. A threshing space is formed between the first cylinder 11 and the first concave 1. In order to prevent the grains from be damaged due to a strong combing effect applied on the crops, the first concave 12 of the present invention is configured that it has no part protruding into the first tip circle; that is, a cylindrical space in which the first cylinder is rotated is not overlapped with a space where first concave is located.

The intermediate feeding mechanism 3 is located behind the first threshing and separating mechanism 1, and comprises an intermediate feeding wheel 32, which comprises a cylindrical body and a plurality of teeth on the body. When the intermediate feeding wheel is rotated, the crops are conveyed backwards with movement of these teeth. Alternatively, the intermediate feeding mechanism 3 is further provided with a roller 31 between the intermediate feeding wheel 32 and the first cylinder 11.

The second threshing and separating mechanism 2 is provided behind the intermediate feeding mechanism, and comprises, as its main parts, a second cylinder 20, a bottom plate 212 and a second concave 232 located below the second cylinder, and a top plate 211 and a cover plate 231 located above the second cylinder.

Figure 3:
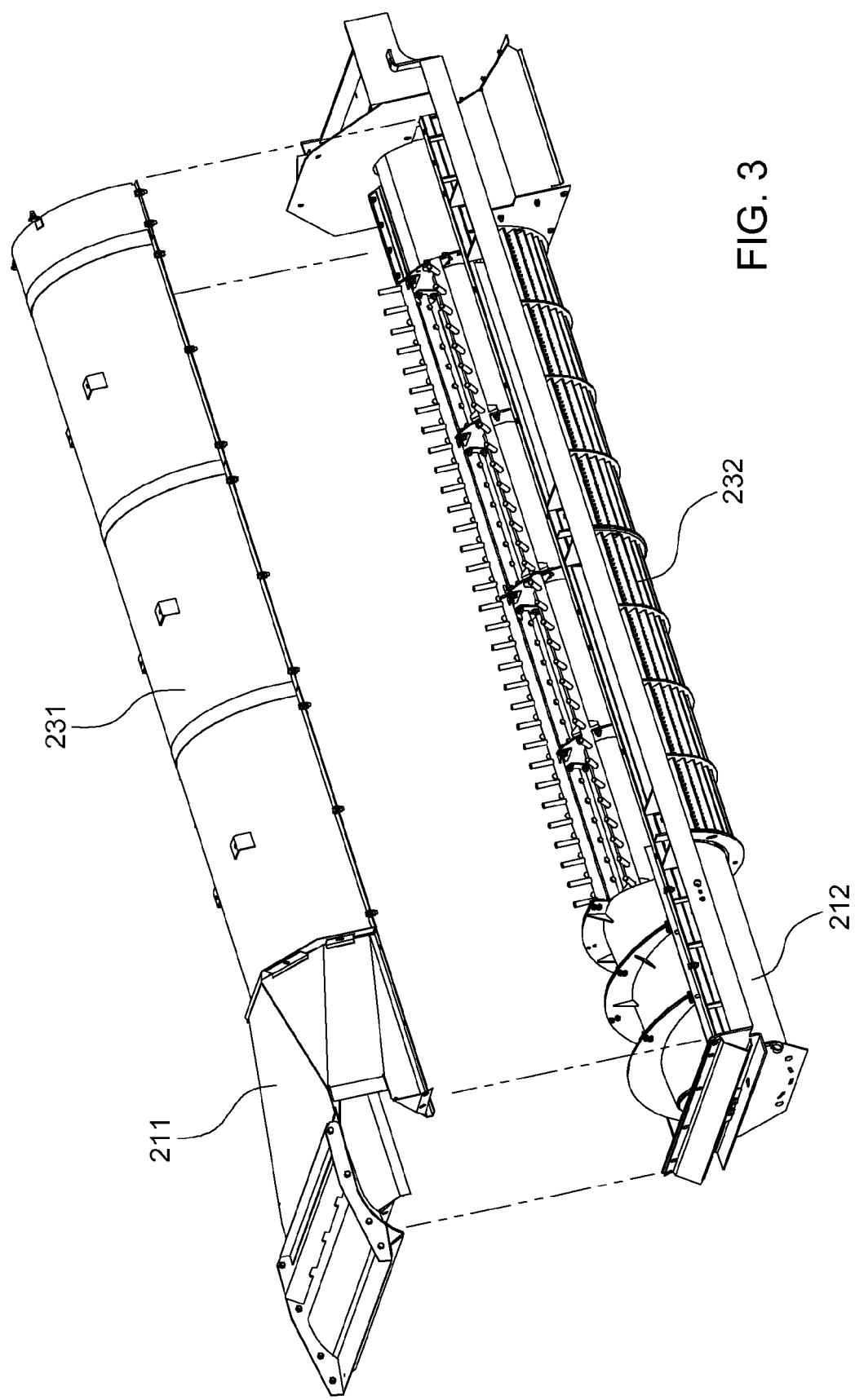
FIG. 3 shows a configuration of combined second cylinder and second concave, with a top plate, a bottom plate and a cover plate being shown in dashing lines.
Figure 4:
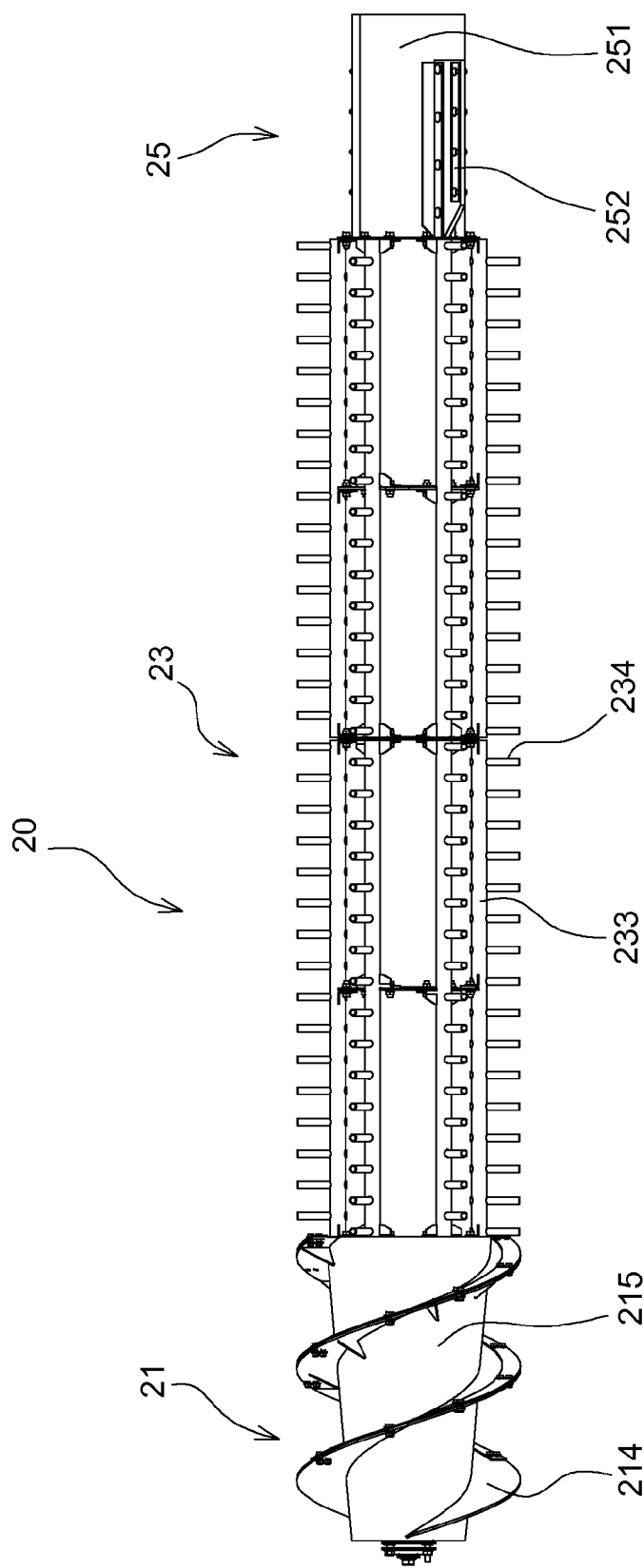
FIG. 4 specifically shows a configuration of the second cylinder.

With reference to FIG. 3 and FIG. 4, the second cylinder 20 has a second rotation axis perpendicular to the first rotation axis; the second rotation axis is not within a horizontal plane, instead, is arranged to be gradually raised from front to back. The second cylinder 20 may be divided into following portions: a forced feeding portion 21 located at a front end of the second cylinder, a toothed-rod cylinder portion 23 located behind the forced feeding portion, and a discharging portion 25 located behind the toothed-rod cylinder portion 23.

Figure 5:
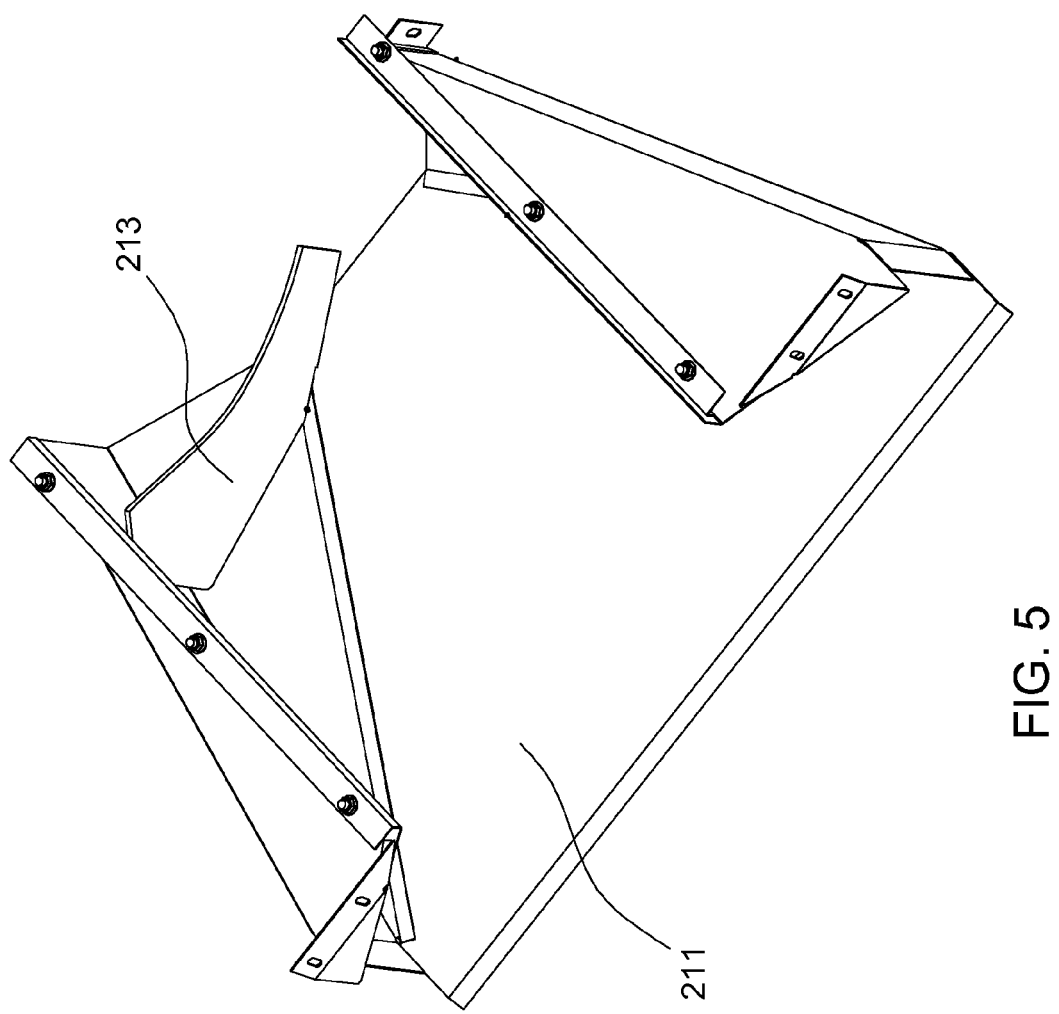
FIG. 5 specifically shows a configuration of the cover plate.

As shown in FIG. 4, the forced feeding portion 21 comprises a truncated cone 215 and two helical blades 214 provided on the truncated cone, and the two helical blades are arranged around the truncated cone 215 and have a phase difference of 180 degrees on the truncated cone 215. A top plate 211 and a bottom plate 212 are respectively provided substantially above and below the forced feeding portion 21, and are engaged with each other to form a feeding chamber surrounding the forced feeding portion 21. In order to provide fluency in feeding crops, the bottom plate 212 has a smooth surface and is provided with no part protruding toward the forced feeding portion; the top plate 211 also has a substantially smooth surface, and is only provided at it rear end with a single guide vane 213 protruding toward the forced feeding portion 21, as shown in FIG. 5. Experimental results show that the single guide vane 213 will not block flowing of the crops backwards, instead, can guide the crops backwards in an uniform manner, thereby avoiding blockage and eccentric load on the second cylinder 20 due to non-uniform feeding of the crops.

The toothed-rod cylinder portion 23 located behind the forced feeding portion 21 comprises a plurality of second rods 233 parallel with each other and uniformly arranged in a circumferential direction of the toothed-rod cylinder portion, and each second rod 233 is provided with a plurality of second threshing teeth 234. These second rods and second threshing teeth are provided to further thresh the crops, and interact with the cover plate 231 and the second concave 232 during rotating so as to separate the grains from the crop stalks. The second concave 232 is provided below the second cylinder 20, and particularly, below the toothed-rod cylinder portion 23; the second concave 232 has a wire-grate configuration, and is provided with no part protruding into the second tip circle, similar to the first concave. A cover plate 231 is correspondingly provided above the second cylinder 20. The cover plate 231 covers the second cylinder 20 from below, and is provided with a plurality of helical guide plates for guiding the crops backwards.

In the present invention, many other improvements are made to the forced feeding portion 21 so that a good feeding performance can be obtained in the forced feeding portion 21 even if the crops are wet and tough and the feeding rate is great.

Outer edges of the helical blades 214 on the forced feeding portion 21 together form an envelope in a form of a cylinder having a constant outer diameter, which is also called as a helical outer diameter of the helical blades. In the present invention, the helical outer diameter is set to be equal to or larger than the diameter of the second tip circle. In all existing products in which crops are fed by design handbooks associated therewith, it is required that the helical outer diameter is smaller than that of the tip circle of the threshing cylinder, that is, a so-called "small cone head" design is required. The above "large cone head" used in the present invention does not lead to reduction in feeding performance, on the contrary, shows a better feeding performance, which can be verified by the experimental results mentioned above. In addition, in the direction of the second rotation axis, the rear ends of the helical blades 214 are located more anteriorly than the front end of the second concave 232, so that the front end of the second concave 232 is located behind the bottom face of the truncated cone. In other words, an engaging interface between the forced feeding portion 21 and the toothed-rod cylinder portion 23 is arranged more anteriorly than that between the bottom plate 212 and the second concave 232. Such an arrangement enables a more smooth feeding and a better threshing effect. In order to ensure a sufficient feeding force, sizes of the helical blades 214 are designed to meet following conditions: higher portions at the front ends of the helical blades have a blade height which is larger than 20% of the helical outer diameter of the helical blades, for example, may be set to be 25% of the helical outer diameter; lower portions at the rear ends of the helical blades have a blade height which is smaller than 15% of the helical outer diameter of the helical blades, for example, may be set to be 13% of the helical outer diameter. There are corresponding requirements for the length of the forced feeding portion 21, and in the present invention, the length of the forced feeding portion 21 in the direction of the second rotation axis is smaller than 30% of a length of the whole second cylinder 20, which, in turn, gives consideration to feeding effect of the forced feeding portion and threshing and separating effects of the toothed-rod cylinder portion; for example, the length of the forced feeding portion may be set to be equal to 20% of the length of the whole second cylinder, which, under the overall design of the present invention, can achieve particularly perfect combined effects of feeding, threshing and separating.

A discharging portion 25 is provided at an end of the second cylinder 20 so as to facilitate discharging crop stalks after threshing and separating. The discharging portion comprises two or more sheet tail wings 252 which are rotatable to stir up the crop stalks. These sheet tail wings 252 are welded to a drum 251 and extend in the second rotation axis, and the drum 251 is rotatable about the second rotation axis as its rotation axis. In an embodiment of the present invention, a length of the sheet tail wings 252 in the second rotation axis is larger than 12%, for example, equal to 15%, of the total length of the second cylinder 20.

The above threshing and separating device can be used in a combine harvester. A typical combine harvester comprises a travelling device for driving the combine harvester to move, a harvesting device provided in the front of the combine harvester for harvesting crops, a conveyer conveying the crops harvested by the harvesting device backwards, and a threshing and separating device for receiving and processing the crops from the conveyer. The threshing and separating device of the present invention is applicable in the above combine harvester.

FIGS. 6 to 11 show a second embodiment of the invention. The threshing and separating device 10 is provided with a first threshing (and separating) mechanism 1 comprising a first cylinder 11 and a first concave 12 at its front part, a second threshing and separating mechanism 2 mainly consisted of two second cylinders 20 and two second concaves 232 at its rear part, and an intermediate feeding mechanism 3 between the first and second threshing and separating mechanisms. Crops, after being fed into the threshing and separating device 10, are threshed by the first cylinder, and threshed grains fall through grids of the first concave into a grain collect system which is not shown; then, the crops are fed to the second threshing and separating mechanism 2 by the intermediate feeding mechanism 3, the crops are threshed and grains and stalks are separated from each other along a path in the second threshing and separating mechanism longer than that in the first threshing and separating mechanism, and the separated stalks are discharged from the rear side, while the separated grains fall into the grain collect system which is not shown.

Figure 6:
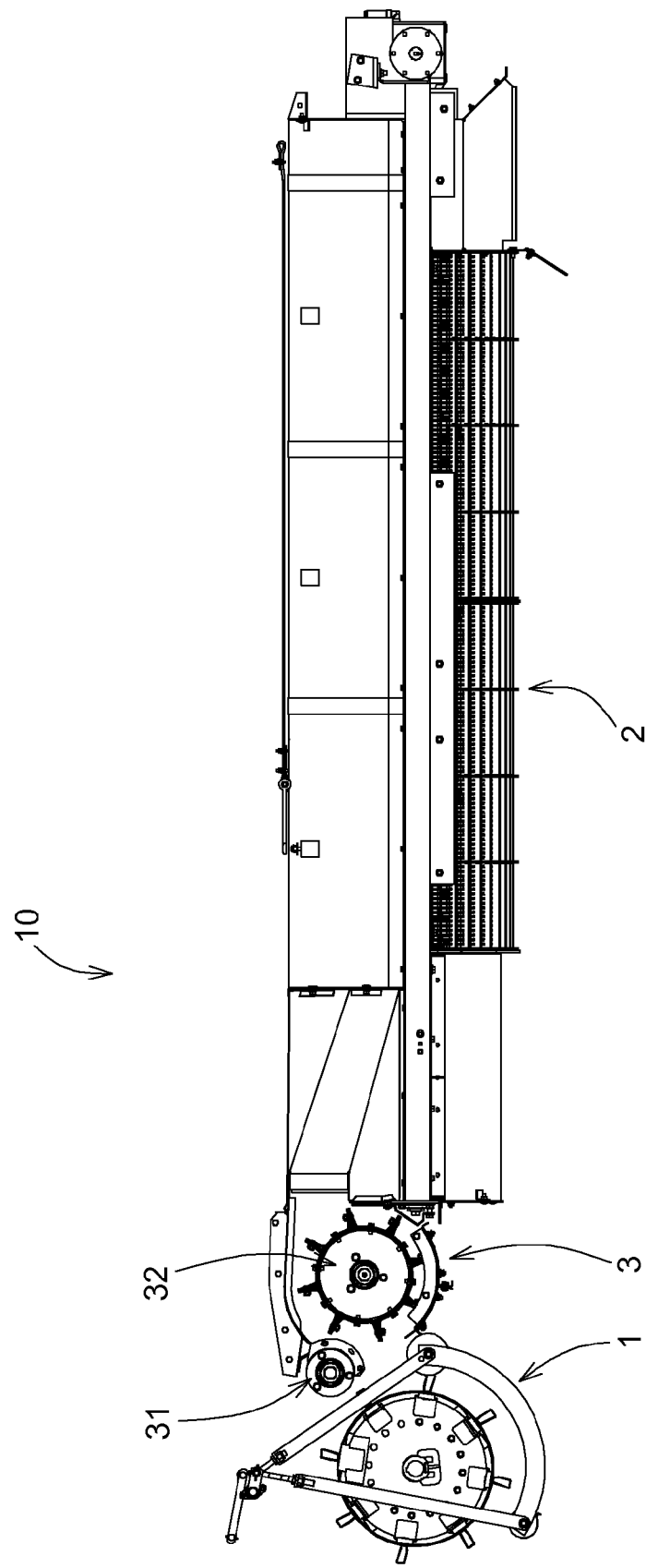
FIG. 6 is a side view showing a whole configuration of a threshing and separating device according to a second embodiment of the present invention.
Figure 7:
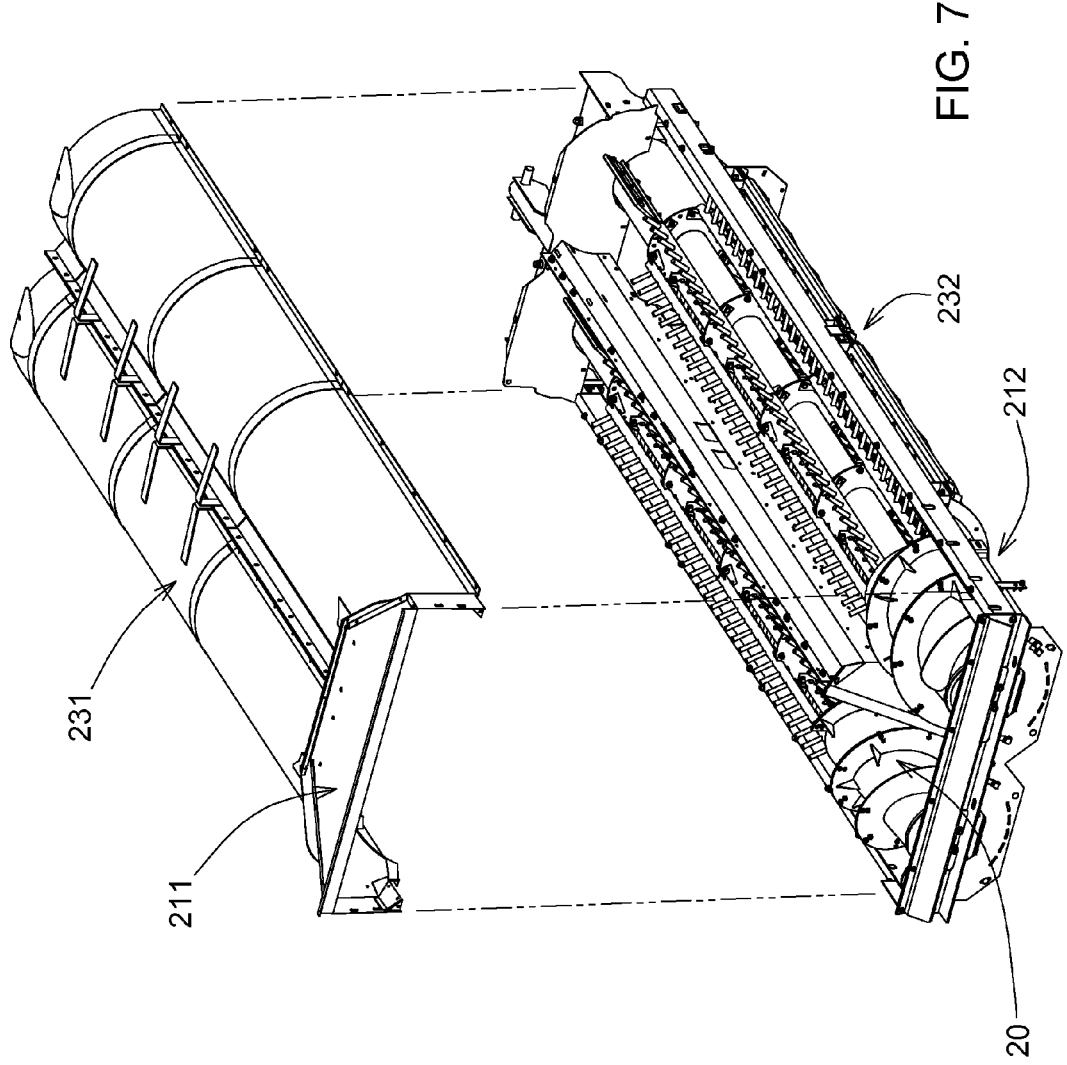
FIG. 7 is a perspective view mainly showing a second threshing and separating mechanism.
Figure 8:
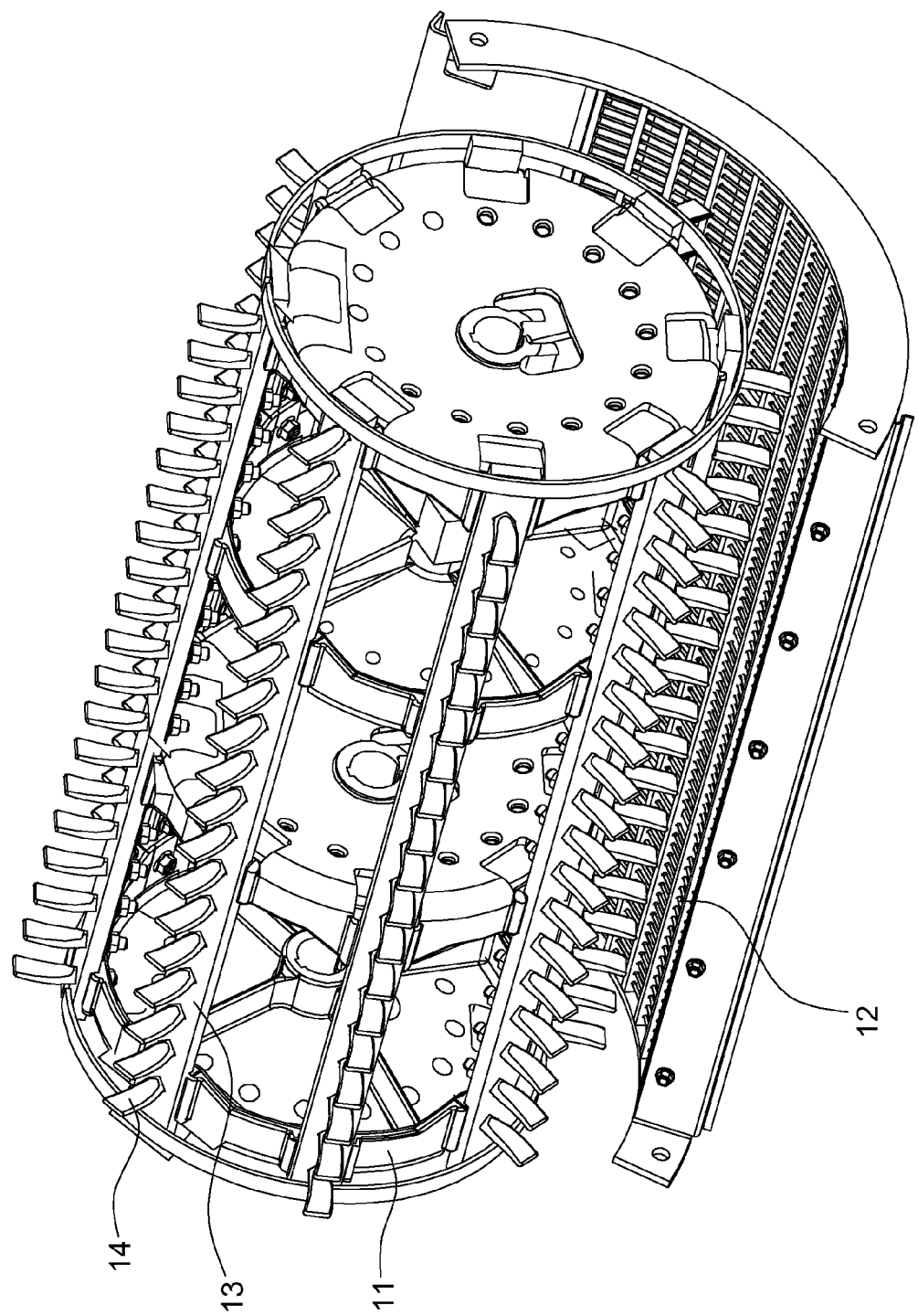
FIG. 8 is a perspective view showing combined first cylinder and first concave.
Figure 9:
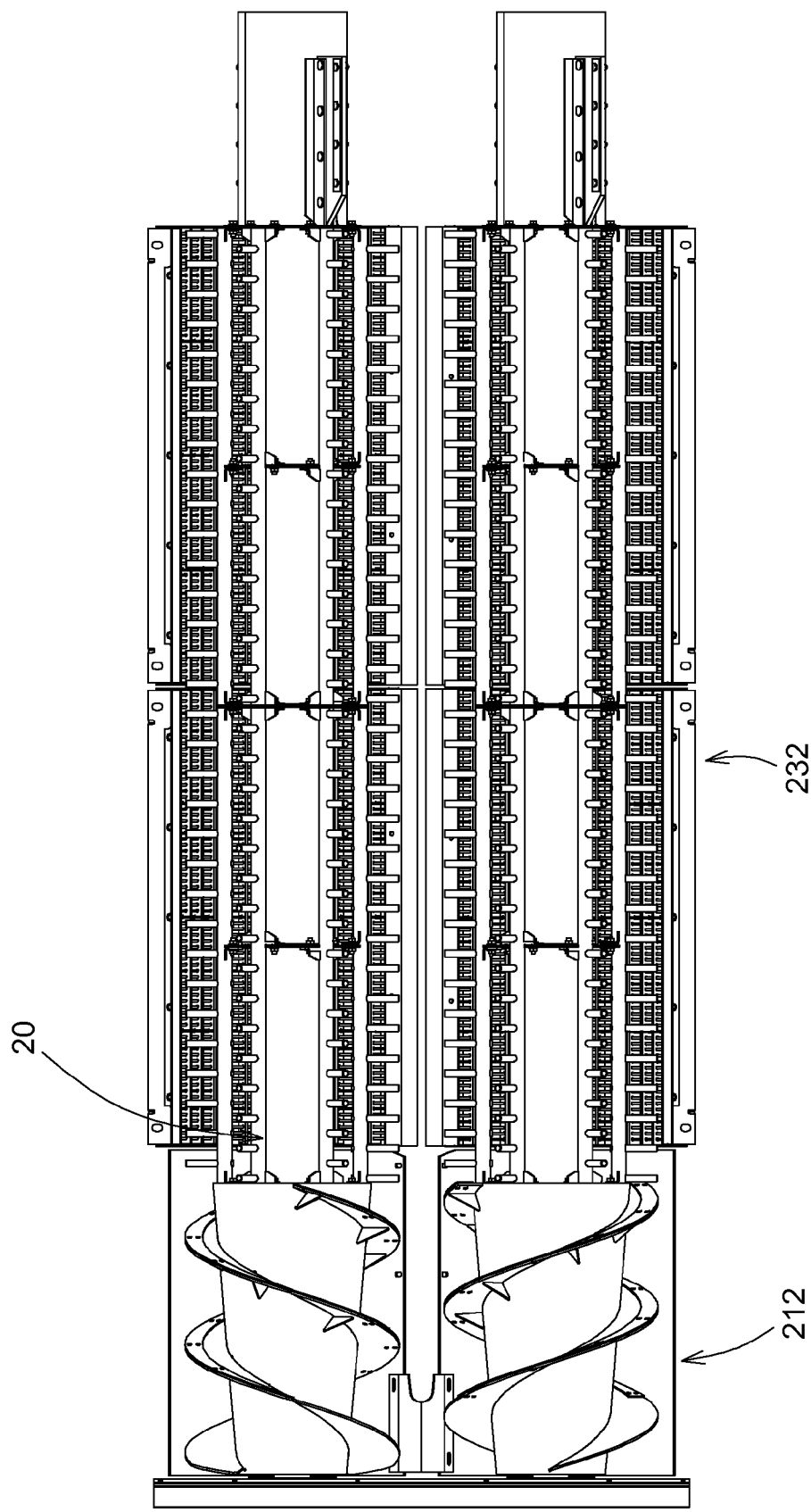
FIG. 9 is a top view showing combined second cylinder and second concave.
Figure 10:
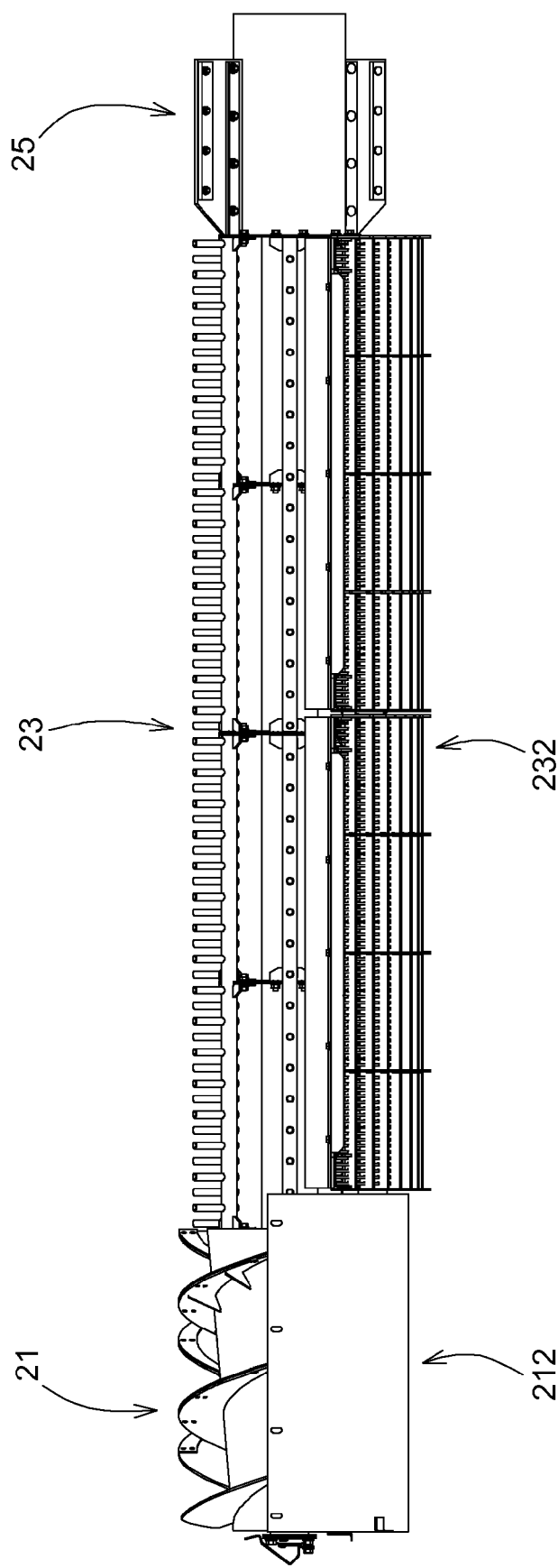
FIG. 10 is a side view showing the combined second cylinder and second concave.

With reference to FIG. 6 and FIG. 8, the first cylinder 11 has a first rotation axis in a horizontal direction, and the first rotation axis is perpendicular to the fore and aft direction and is often in a right and left direction of a combine harvester comprising the threshing and separating device. The first cylinder 11 comprises a plurality of first rods 13, which are parallel to the first rotation axis and uniformly arranged in a circumferential direction of the first cylinder; each first rod 13 is provided with a plurality of first threshing teeth 14 each having a tip, all teeth have same length and their tips define a first cylindrical space, so each tip defines a first tip circle. Here the first cylindrical space and first tip circle have same meaning. The first concave 12 is a partial cylinder having a wire-grate configuration, located below and partially surrounds the first cylinder. A threshing space is formed between the first cylinder 11 and the first concave 12. In order to prevent the crop grains from being damaged due to a strong combing or threshing effect applied on the crops, in the present invention, the first concave 12 is configured so that it has no part protruding into the first tip circle; that is, a cylindrical space in which the first cylinder is rotated is not overlapped with a space where first concave is located.

The intermediate feeding mechanism 3 is located behind the first threshing and separating mechanism 1, and comprises an intermediate feeding wheel 32, which comprises a cylindrical body and a plurality of teeth on the body. When the intermediate feeding wheel is rotated, the crops are conveyed backwards with movement of these teeth. Alternatively, the intermediate feeding mechanism 3 is further provided with a roller 31 between the intermediate feeding wheel 32 and the first cylinder 11.

Figure 11:
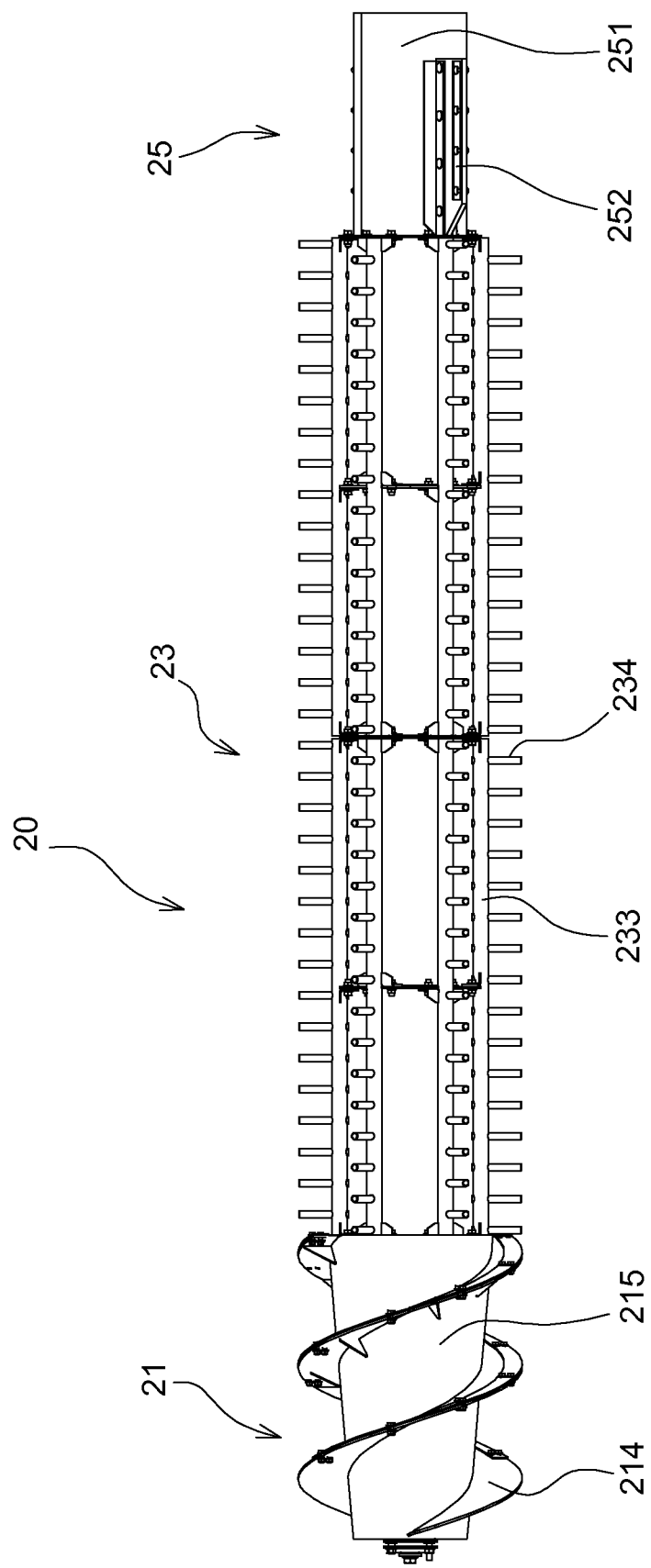
FIG. 11 is a side view showing one of the second cylinders.

With reference to FIG. 11, the second threshing and separating mechanism 2 is provided behind the intermediate feeding mechanism, and comprises, as its main parts, two second cylinders 20 having the same size and arranged in parallel, a bottom plate 212 and two second concaves 232 located below the second cylinders, and a top plate 211 and two cover plates 231 located above the second cylinders.

With reference to FIG. 6 to FIG. 11, each second cylinder 20 has a second rotation axis perpendicular to the first rotation axis; the second rotation axis may be arranged to be gradually raised from front to back. The second cylinder 20 may be divided into following portions: a forced feeding portion 21 located at a front end of the second cylinder, a toothed-rod cylinder portion 23 located behind the forced feeding portion, and a discharging portion 25 located behind the toothed-rod cylinder portion 23.

As shown, the forced feeding portion 21 comprises a truncated cone 215 and two helical blades 214 provided on the truncated cone, and the two helical blades are arranged around the truncated cone 215 and have a phase difference of 180 degrees on the truncated cone 215. A top plate 211 and a bottom plate 212 are respectively provided substantially above and below the forced feeding portion 21, and are engaged with each other to form a feeding chamber surrounding the forced feeding portion 21. In order to provide fluency in feeding crops, the bottom plate 212 has a smooth surface and is provided with no part protruding towards the forced feeding portion; the top plate 211 also has a substantially smooth surface, thereby the crops can flow smoothly backwards.

The toothed-rod cylinder portion 23 located behind the forced feeding portion 21 comprises a plurality of second rods 233 parallel with each other and uniformly arranged in a circumferential direction of the toothed-rod cylinder portion, each second rod 233 is provided with a plurality of second threshing teeth 234. These second rods and second threshing teeth are provided to further thresh the crops, and interact with the cover plate 231 and the second concave 232 during rotating so as to separate the grains from the crop stalks. The second concave 232 is provided below the second cylinder 20, and particularly, right below the toothed-rod cylinder portion 23; the second concave 232 has a wire-grate configuration, and is provided with no part protruding into the second tip circle, which is defined by a tooth tip of a rod, similar to the first concave. A cover plate 231 is correspondingly provided above each second cylinder 20. The cover plate 231 covers its corresponding second cylinder 20 from below, and is provided with a plurality of helical guide plates for guiding the crops backwards.

Outer edges of the helical blades 214 on the forced feeding portion 21 together form an envelope in a form of a cylinder having a constant outer diameter, which is also called as a helical outer diameter of the helical blades. In the present invention, the helical outer diameter is set to be equal to or larger than the diameter of the second tip circle. In all existing products in which crops are fed by design handbooks associated therewith, it is required that the helical outer diameter is smaller than that of the tip circle of the threshing cylinder, that is, a so-called "small cone head" design is required. The above "large cone head" used in the present invention does not lead to reduction in feeding performance, on the contrary, shows a better feeding performance, which can be verified by the experimental results mentioned above. In addition, in the direction of the second rotation axis, the rear ends of the helical blades 214 are located more anteriorly than the front end of the second concave 232, so that an engaging interface between the forced feeding portion 21 and the toothed-rod cylinder portion 23 is arranged more anteriorly than that between the bottom plate 212 and the second concave 232. Such an arrangement enables a more smooth feeding and a better threshing effect. In order to ensure a sufficient feeding force, sizes of the helical blades 214 are designed to meet following conditions: higher portions at the front ends of the helical blades have a blade height (a height protruding in a radial direction of the cylinder from a conical surface on which the helical blades are provided) which is larger than 20% of the helical outer diameter of the helical blades, for example, may be set to be 25% of the helical outer diameter; lower portions at the rear ends of the helical blades have a blade height which is smaller than 15% of the helical outer diameter of the helical blades, for example, may be set to be 13% of the helical outer diameter. There are corresponding requirements for the length of the forced feeding portion 21, and in the present invention, the length of the forced feeding portion 21 in the direction of the second rotation axis is smaller than 30% of a length of the whole second cylinder 20, which, in turn, gives consideration to feeding effect of the forced feeding portion and threshing and separating effects of the toothed-rod cylinder portion; for example, the length of the forced feeding portion may be set to be equal to 20% of the length of the whole second cylinder, which, under the overall design of the present invention, can achieve particularly perfect combined effects of feeding, threshing and separating.

A discharging portion 25 is provided at an end of the second cylinder 20 so as to facilitate discharging crop stalks after threshing and separating. The discharging portion comprises two or more sheet tail wings 252 which are rotatable to stir up the crop stalks. These sheet tail wings 252 are welded to a drum 251 and extend in the second rotation axis, and the drum 251 is rotatable about the second rotation axis as its rotation axis. In an embodiment of the present invention, a length of the sheet tail wings 252 in the second rotation axis is larger than 12%, for example, equal to 15%, of the total length of the second cylinder 20.

The invention claimed is:

1. A threshing and separating device comprising:
   a threshing mechanism comprising a first cylinder and a first concave located below the first cylinder;
   a separating mechanism comprising at least one second cylinder and a second concave located below the second cylinder; and
   an intermediate feeding mechanism between the threshing mechanism and the separating mechanism;
   wherein the first cylinder is rotatable about a first rotation axis and comprises a plurality of first rods parallel to the first rotation axis and uniformly arranged in a circumferential direction of the first cylinder, and each first rod is provided with a plurality of first threshing teeth each having a tip defining a first tip circle and the second cylinder is rotatable about a second rotation axis perpendicular to the first rotation axis;
   wherein the first concave comprises a wire-grate configuration, and a surface of the first concave facing the first cylinder is provided with no part protruding into the first tip circle;
   wherein the second cylinder comprises a forced feeding portion located at the front end of the second cylinder, and comprising a truncated cone and helical blades on the truncated cone; and a toothed-rod cylinder portion located behind the forced feeding portion with a plurality of second rods parallel to the second rotation axis and uniformly arranged in a circumferential direction of the toothed-rod cylinder portion, and each second rod is provided with a plurality of second threshing teeth each having a tip defining a second tip circle; and
   wherein the second concave has a wire-grate configuration and is provided with no part protruding into its corresponding second tip circle.

2. The threshing and separating device according to claim 1, comprising a top plate located above the forced feeding portion and a bottom plate located below the forced feeding portion, and the top plate and the bottom plate are engaged with each other to form a feeding chamber surrounding the forced feeding portion; and the bottom plate has an arc shape partially surrounding the forced feeding portion, is connected with the second concave, and is provided with no part protruding toward the forced feeding portion.

3. The threshing and separating device according to claim 1, wherein in the direction of the second rotation axis, the front end of the second rod is located more anteriorly than that of its corresponding second concave.

4. The threshing and separating device according to claim 1, wherein an outer edge of each helical blade has a constant helical outer diameter larger than or equal to a diameter of the second tip circle.

5. The threshing and separating device according to claim 4, wherein a blade height of a front end of the helical blade protruding from a surface of the truncated cone is larger than 20% or 25% of the helical outer diameter of the helical blade.

6. The threshing and separating device according to claim 4, wherein a blade height of a rear end of the helical blade protruding from the surface of the truncated cone is smaller than 15% or 13% of the helical outer diameter of the helical blade.

7. The threshing and separating device according to claim 1, wherein in a direction of the second rotation axis, the forced feeding portion has a length smaller than 30% or 20% of a length of the second cylinder.

8. The threshing and separating device according to claim 2, wherein the top plate is provided, at its rear end, with at least one guide vane protruding toward the forced feeding portion.

9. The threshing and separating device according to claim 1, wherein the second cylinder is provided, at its end, with at least two sheet tail wings extending in the direction of the second rotation axis.

10. The threshing and separating device according to claim 9, wherein a length of the sheet tail wings in the direction of the second rotation axis is larger than 12% or equal to 15% of a total length of the second cylinder.

11. The threshing and separating device according to claim 1, wherein the separating mechanism comprises two second cylinders arranged in parallel and two second concaves arranged in parallel and perpendicular to the first rotation axis, each one of the second concaves is arranged below a corresponding one of the second cylinders, each second cylinder comprises a forced feeding portion located at front end of the second cylinder and a truncated cone and helical blades on the truncated cone; and a toothed-rod cylinder portion located behind the forced feeding portion and comprising a plurality of second rods parallel to the rotation axis of the second cylinder and uniformly arranged in a circumferential direction of the toothed-rod cylinder portion, each second rod is provided with a plurality of second threshing teeth each having a tip defining a second tip circle and each second concave has a wire-grate configuration and is provided with no part protruding into its corresponding second tip circle.

12. A combine harvester comprising:
    a travelling device for driving the combine harvester to move;
    a harvesting device provided in the front of the combine harvester for harvesting crops;
    a conveyer conveying the crops harvested by the harvesting device backwards; and
    the threshing and separating device according to claim 1 for receiving and processing the crops from the conveyer.

* * * * *

UNITED STATES PATENT AND TRADEMARK OFFICE
CERTIFICATE OF CORRECTION

PATENT NO.         : 9,456,550 B2                               Page 1 of 1
APPLICATION NO.    : 14/627453
DATED              : October 4, 2016
INVENTOR(S)        : Suen et al.

It is certified that error appears in the above-identified patent and that said Letters Patent is hereby corrected as shown below:

On the Title Page

Item (72) should read:
Benjamin C. Suen, Bettendorf, IA (US); Yibin Zhuang, Tianjin (CN); Junbang Li, Tianjin (CN); Fengbin Pang, Tianjin (CN); Yanpeng Han, Tianjin (CN); Hongyuan Wang, Tianjin (CN); Xiubing Pang, Tianjin (CN); Baohua Zhen, Tianjin (CN)

Signed and Sealed this
Seventh Day of November, 2017

Joseph Matal
*Performing the Functions and Duties of the*
*Under Secretary of Commerce for Intellectual Property and*
*Director of the United States Patent and Trademark Office*